July 18, 1933.     F. W. PETERS     1,918,613
UNIVERSAL JOINT
Filed June 7, 1928
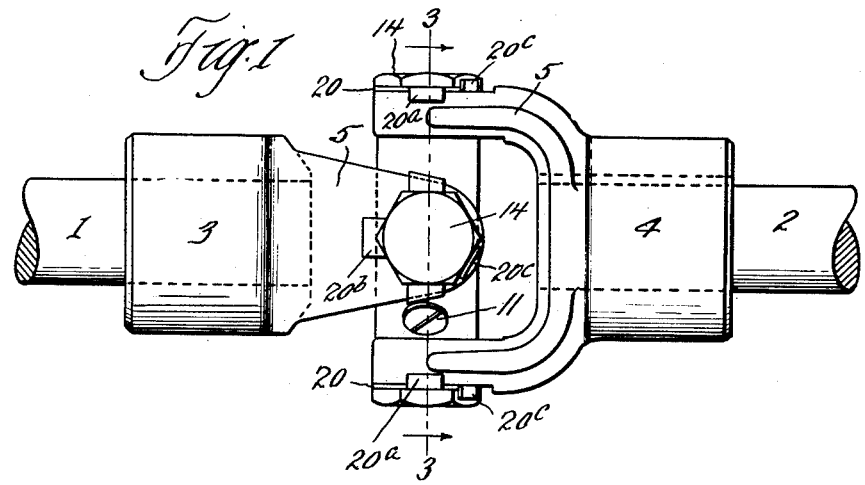
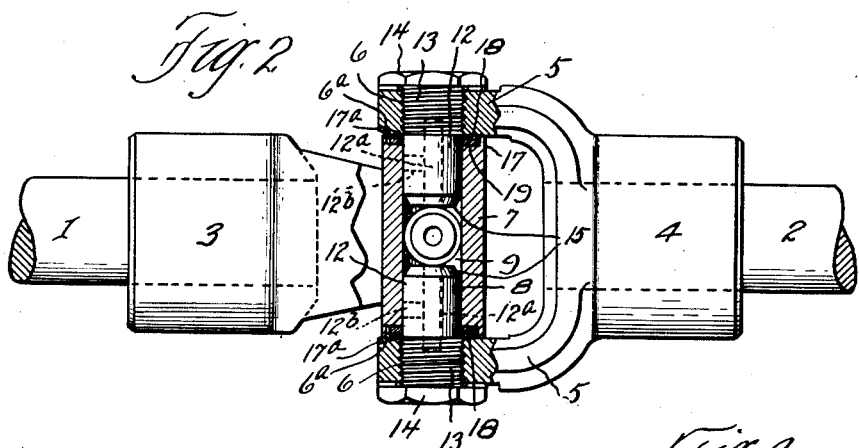
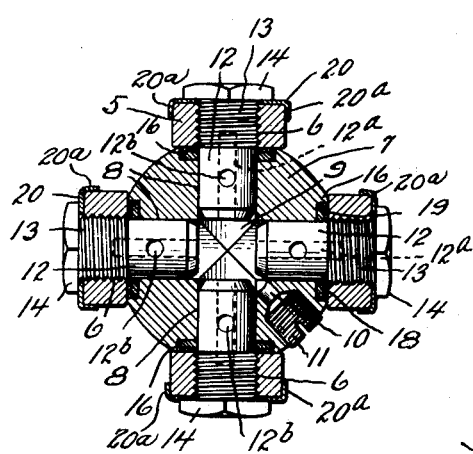
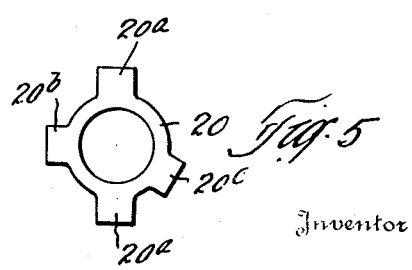
Inventor
Frederick W. Peters,
By Hull, Brock & West,
Attorneys Patented July 18, 1933

1,918,613

UNITED STATES PATENT OFFICE

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO

UNIVERSAL JOINT

Application filed June 7, 1928. Serial No. 283,506.

This invention relates to universal joints, and has for its general object to produce a joint of this type which is extremely compact, as well as simple in construction and economical of production, but which will enable lubricant to be supplied efficiently to the working parts thereof. A further object of the invention is to provide a joint of this character with an effective packing between the trunnion pins and the main body of the connecting block or member; and a still further object of the invention is to provide a joint of this character with simple, convenient, and effective means for locking the trunnion pins in various adjusted positions.

I accomplish the foregoing objects in and through the construction and arrangement of parts shown in the drawing, wherein Fig. 1 represents a side elevation of a joint embodying my invention; Fig. 2, a sectional side elevation of such joint; Fig. 3, a detail in section corresponding to the line 3—3 of Fig. 1; Fig. 4, a detail in bottom plan of the retainer member of the packing; and Fig. 5, a detail in plan of the locking plate or washer which is employed for each of the trunnion pins.

Describing the various parts by reference characters, 1 and 2 denote the shaft members to be connected, the shaft 1 being shown as secured to and within a hub 3 and the shaft 2 being shown as secured to, and within, a hub 4, each of the said hubs carrying forks comprising diverging arms 5. Each of the arms 5 is provided within the outer end thereof with a threaded bore 6.

Cooperating with the yoke arms 5 is a connecting member indicated at 7 and comprising a metal block, preferably substantially circular in outline and having four bores 8 arranged 90° apart and extending from the peripheral portion thereof to a chamber 9 in the center. This chamber is adapted to contain lubricant, and the block is provided with a filling aperture 10 which is shown as closed by a threaded plug 11, through which aperture the lubricant may be introduced into the chamber 9 from time to time.

The arms 5 and the blocks 7 are connected by means of trunnion pins each comprising a cylindrical body 12 constituting a bearing portion which fits within one of the bores 8. Beyond the cylindrical portion 12 thereof each pin is provided with a thread 13 whereby it may be screwed through the aperture 6 in one of the arms 5. The outer end of each pin is provided with a hexagonal head 14, and the inner end is tapered or frusto-conical in shape, as shown at 15. In order to increase the space available within the block for lubricant, each pin is provided with a central bore $12^a$ from which one or more ports $12^b$ serve to conduct lubricant to the space between the exterior of the pin and the interior of the bore 8 within which it is fitted.

For the purpose of preventing leakage of lubricant from the bores 8, the block is provided with annular recesses 16 extending thereinto from the peripheral portion thereof and each surrounding the outer end of a bore. Seated in each of said recesses is a packing comprising a sheet metal retainer member and compressible packing material, the retainer member being preferably of spring steel, angular in cross section, and comprising a side flange 17 and a base flange 18, the retainer being of such size as to fit within the appropriate recess 16 and to receive therewithin compressible packing material 19, such as cork, the cork being adapted to engage the cylindrical surface of the appropriate trunnion pin.

In order to anchor the retainer members in place, each is provided with a lip $17^a$ projecting therefrom and extending at an angle with respect to the flange 18, the lip being received within a notch $6^a$ formed in the outer portion of the adjacent inner face of the arm 5 in which the pin is mounted.

By placing the cupped retainer or washer with the base flange in position to be engaged by the yoke arms, the cork packing is kept in shape for assembling purposes and is also protected against destruction through the insertion of the pins through such arms. Furthermore, the cork is protected against wearing by contact with the yoke arms.

In order to permit a fine adjustment of the trunnion pins to compensate for wear and also to retain the pins in place, I have provided locking washers each comprising an annular body 20, which washers are adapted to be inserted between the heads of the trunnion pins and the outer faces of the arms 5. Each of these washers is provided with four tongues projecting therefrom. Two of these tongues, 20ª, are spaced 180° apart and are adapted to be bent down into engagement with opposite sides of an arm 5. In addition, each washer is provided with a tongue 20ᵇ arranged 90° distant from the tongues 20ª and adapted to be bent into engagement with one of the hexagonal faces of the head 14 of the cooperating trunnion pin, when such face is in proper position to be engaged by such tongue. In addition, each washer has a tongue 20ᶜ spaced 60° from one of the tongues 20ª and on the opposite side of the washer from the tongue 20ᵇ, and also arranged to be bent into engagement with a face of the head 14. By this arrangement, one or the other of the tongues 20ᵇ, 20ᶜ, may be used to lock a pin in its adjusted position; and one or the other of these tongues may be so bent into engagement with a face of such head for every 30-degree rotation of such pin.

The joint described and shown herein is extremely simple of construction and economical of production, as well as being compact and capable of operating for the purpose of lubricating the bearings formed between the trunnion pins and the bores thereof, while providing an effective seal against the leakage of lubricant. Furthermore, the pins may be easily and conveniently adjusted from time to time, as occasion may require, and may be locked in their adjusted position with a capability of fine and close adjustment. The tapering of the inner ends of the trunnion pins not only increase the space available for lubricant within the interior of the connecting block, but also facilitates the assembly of the pins through the packing washer assemblies each comprising the containers 17, 18 and the compressible packing material 19.

Having thus described my invention, what I claim is:—

1. In a universal joint, the combination of a driving and a driven member each having a pair of arms provided each adjacent to its outer end with a threaded bore, a connecting member having a central lubricant containing chamber provided with a connection for supplying lubricant thereto and having bores extending radially outwardly therefrom and adapted to register with the bores in said arms, said connecting member being provided with an annular recess at the outer end of and surrounding each bore thereof, a packing ring in each said recess, and trunnion pins threaded through the bores in said arms and into the corresponding bores in said connecting member, the inner ends of said pins being spaced apart and each of said pins having a bore extending outwardly from the inner end thereof and communicating with the chamber in said connecting member and also having a port extending laterally from such bore through the side wall of such pin and being located between the said packing ring and the inner end of the bore of said connecting member in which the said pin is mounted.

2. In a universal joint, the combination of a driving and a driven member each having a pair of arms provided each adjacent its outer end with a bore, a connecting block having a lubricant containing space therein and connected to said arms by means of trunnion pins mounted in the bores of said arms and projecting into bores in said block which extend outwardly from the lubricant containing space therein, the said block having an annular recess projecting thereinto from the outer surface thereof and surrounding the outer end of each of the bores thereof, a packing for each recess comprising an annular metal container angular in section and adapted to fit within such recess, each container having a tongue projecting therefrom adapted to be anchored in a notch in the adjacent face of the cooperating arm, and compressible packing material in said container and surrounding the cooperating trunnion pin.

3. In a universal joint, the combination of a driving and a driven member each having a pair of arms and each arm being provided with a bore therethrough, a connecting member having a chamber for lubricant, trunnions mounted in said arms and connecting the same with the said connecting member, the said connecting member having an annular recess projecting thereinto from the outer surface thereof and surrounding each trunnion, a packing for each recess comprising a metal container angular in cross section and mounted in each such recess and having an outwardly extending tongue adapted to fit within a notch provided therefor in the inner face of the adjacent arm, and compressible packing material in said container and surrounding the cooperating trunnion.

4. In a universal joint, the combination of a driving and a driven member each having a pair of arms and each arm having a threaded bore extending therethrough, a connecting member having bores adapted to register with the bores in said arms, trunnion pins each having a hexagonal head and provided each with a threaded portion adjacent said head and with a bearing portion extending inwardly from the threaded portion whereby the said pins may connect the said arms and the said connecting member by being threaded into the bores of said arms, and a lock washer interposed between the outer face of each arm and the head of each trunnion, the said washer having a pair of diametrically opposed tongues adapted to be bent into engagement with opposite sides of an arm and with a tongue spaced equidistantly from the first mentioned tongues and adapted to be bent into engagement with one of the side faces of the head and also with an additional tongue spaced less than 90° from one of the first mentioned tongues and adapted to be bent into engagement with a face of such head.

5. In a universal joint, the combination of a driving and a driven member each having a pair of arms and each arm having a threaded bore extending therethrough, a connecting member having bores adapted to register with the bores in said arms, trunnion pins each having a hexagonal head and provided each with a threaded portion adjacent said head and with a bearing portion extending inwardly from the threaded portion whereby the said pins may connect the said arms and the said connecting member by being threaded into the bores of said arms, and a lock washer interposed between the outer face of each arm and the head of each trunnion, the said washer having a pair of diametrically opposed tongues adapted to be bent into engagement with opposite sides of an arm and with a tongue spaced equidistantly from the first mentioned tongues and adapted to be bent into engagement with one of the side faces of the head, and also with an additional tongue located 60° from one of the first mentioned tongues and adapted to be bent into engagement with a face of said head.

6. In a universal joint, the combination of a driving and a driven member each having a pair of arms provided each adjacent its outer end with a bore, a connecting block having a lubricant containing space therein and connected to said arms by means of trunnion pins mounted in the bores of said arms and projecting into bores in said block which extend outwardly from the lubricant containing space therein, the said block having an annular recess surrounding the outer end of each of the bores thereof, a packing for each recess comprising an annular metal container angular in section and fitted within such recess with its base wall arranged to be engaged by the inner surface of the arm adjacent thereto and with its marginal flange fitting within the recess of the block, and compressible packing material in said container and surrounding the cooperating trunnion pin, the said container having an outwardly extending tongue adapted to fit within a notch provided therefor in the inner face of the arm adjacent thereto.

FREDERICK W. PETERS.